(12) United States Patent
Dauvergne

(10) Patent No.: US 6,186,887 B1
(45) Date of Patent: *Feb. 13, 2001

(54) INSTRUMENT PANEL FOR A VEHICLE

(75) Inventor: Jean Dauvergne, Gondecourt (FR)

(73) Assignee: Plastic Omnium Auto Interierur, Lyons (FR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/988,495

(22) Filed: Dec. 10, 1997

(51) Int. Cl.⁷ .................................................. B60H 1/26
(52) U.S. Cl. .................. 454/152; 296/208; 454/121; 454/127
(58) Field of Search ..................... 454/121, 127, 454/152, 155; 296/190.09, 208

(56) References Cited

U.S. PATENT DOCUMENTS

| | | | |
|---|---|---|---|
| 3,724,357 | * 4/1973 | Kavthekar et al. | 454/152 |
| 5,354,114 | * 10/1994 | Kelman et al. | 454/127 X |
| 5,358,300 | * 10/1994 | Gray | 296/208 X |
| 5,364,159 | * 11/1994 | Kelman et al. | 296/208 X |
| 5,673,964 | * 10/1997 | Roan et al. | 454/127 X |
| 5,678,877 | * 10/1997 | Nishijima et al. | 296/208 X |
| 5,707,100 | * 1/1998 | Suyama et al. | 296/208 X |
| 5,762,395 | * 6/1998 | Merrifield et al. | 454/152 X |

FOREIGN PATENT DOCUMENTS

| | | | |
|---|---|---|---|
| 38 18 666 | * 12/1988 | (DE) | 454/152 |
| 5-104937 | * 4/1993 | (JP) | 454/127 |
| 1504149 | * 8/1989 | (SU) | 454/152 |

* cited by examiner

Primary Examiner—Harold Joyce
(74) Attorney, Agent, or Firm—Harrison & Egbert

(57) ABSTRACT

An instrument panel for vehicles, in particular automobiles, which is fitted to allow circulation of an air flow for ventilation, heating and/or air conditioning of the passenger compartment of the vehicle. The instrument panel has at least one cross strut which serves to strengthen the resistance of the vehicle to lateral shocks. This strut is tubular so as to form at least a conduit for air flow. The cross strut is fitted with openings so as to allow the distribution of air in the passenger compartment. The cross strut is visible in the passenger compartment.

8 Claims, 4 Drawing Sheets

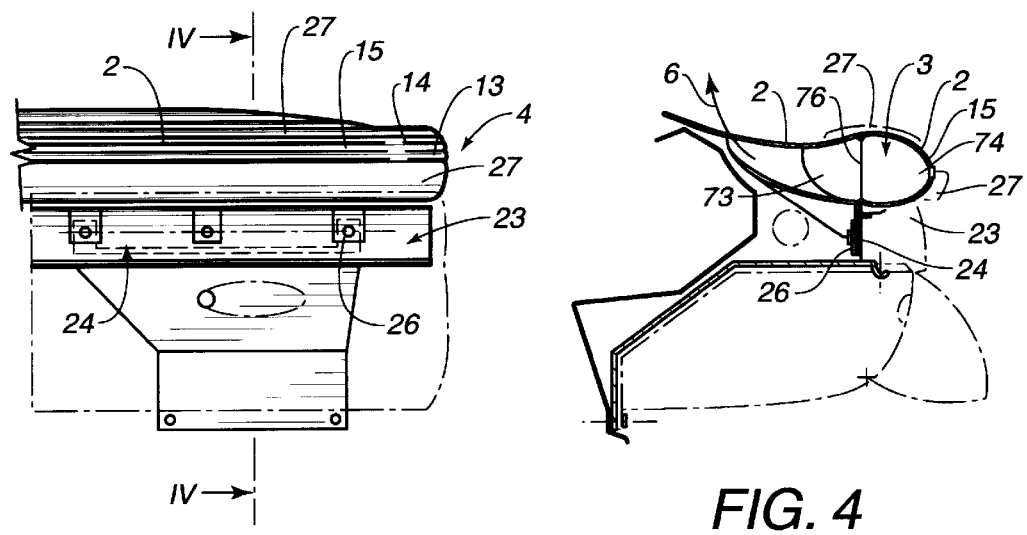
FIG. 3
FIG. 4
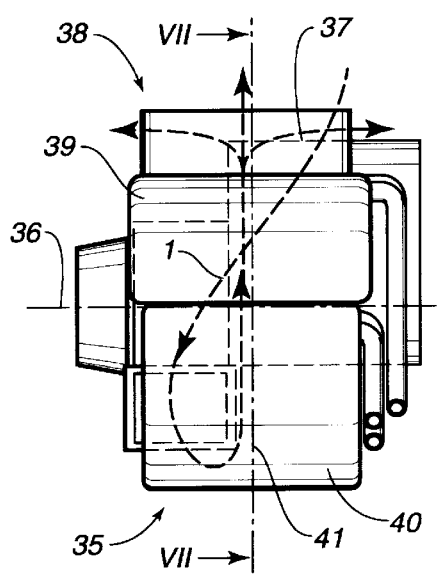
FIG. 6
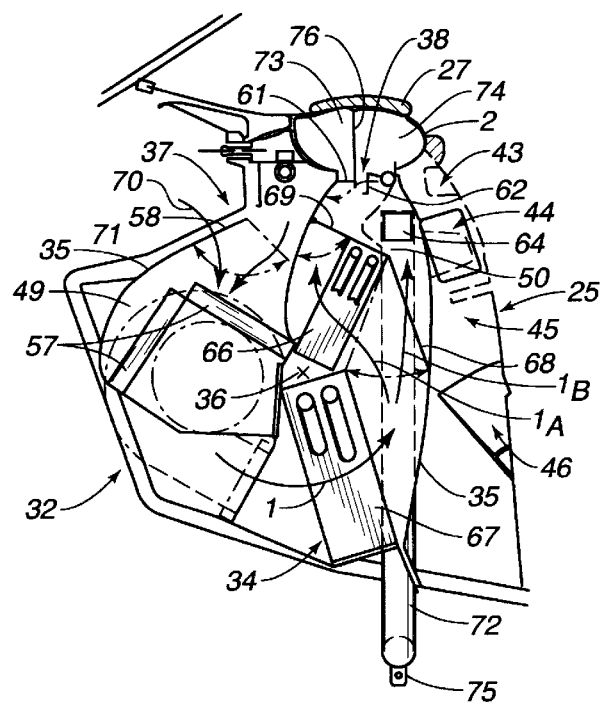
FIG. 7

INSTRUMENT PANEL FOR A VEHICLE

TECHNICAL FIELD OF THE INVENTION

The invention presented here involves an instrument panel for a vehicle, designed in particular for automobiles.

However, although developed most particularly for applications of that sort, it may also be used in numerous other nautical, air and/or terrestrial vehicles.

In a general way, moreover, it will be possible to implement it as internal fittings which combine different accessories and/or equipment, in all the areas of economic activity in which one encounters control stations, switchboards, or other stations that may be in fixed or mobile installations.

BACKGROUND ART

Currently, instrument panels for automotive vehicles are generally made of a covering panel which makes it possible to conceal the components of the equipment and/or the accessories such as, for example, air conditioning units connected by different conduits between them which come out at openings arranged in the panel.

The equipment and/or accessory components are fastened using several casings to the body of the vehicle or, to some of its reinforcement components such as, for example, transverse bars provided under the covering panel for reinforcement against lateral stresses.

The first disadvantage of these instrument panels is that they have a very large number of different components. Moreover, the different components are arranged independently of each other under the covering panel, particularly as a function of the restrictions imposed by the vehicle class, the position of its steering column or others. In case of modification, it is thus necessary to redefine all of the locations of the components and particularly for those components which provide air conditioning inside the vehicle.

It is also to be noted that such covering panels have a higher weight and increasing the number of different equipment and/or accessory components leads to cluttering the available space to the detriment, for example, of the volume of the trash containers and/or boxes customarily found at this level.

The purpose of the invention presented here is to present an instrument panel for a vehicle which compensates for the aforementioned disadvantages and has a limited number of components.

Another purpose of the invention presented here is to propose an instrument panel for a vehicle which may be easily adapted to one type of vehicle or another, by consisting of a maximum number of components, the positioning of which does not need to be redefined, and/or by making consolidations, particularly involving the components which provide air conditioning in the vehicle passenger compartment.

Another purpose of the invention presented here is to present an instrument panel whose manufacture and/or installation would be simplified.

Another purpose of the invention presented here is to propose an instrument panel for vehicles which has a limited weight.

Another purpose of the invention presented here is to propose an instrument panel for vehicles, allowing an increase in the volume of the storage space.

Other purposes and advantages of the invention presented here are apparent in the course of the following description which is only a guideline and whose purpose is not to limit the invention.

SUMMARY OF THE INVENTION

The invention presented here involves an instrument panel for vehicles, designed in particular for automobiles, fitted to allow at least the circulation of an air flow for ventilation, heating and/or air conditioning of the vehicle passenger compartment, having at least one cross strut suitable for strengthening the resistance of the vehicle to lateral shocks, the cross strut is tubular so that it is able to form at least one conduit for the air flow.

BRIEF DESCRIPTION OF THE DRAWINGS

The invention presented here is better understood in reading the following description, accompanied by the attached drawings which make up an integral part of it, and among which:

FIG. 3 shows, in a front view, a part of the instrument panel depicted by the preceding drawings, designed to be located towards the passenger at the front of the equipped vehicle, FIG. 4 is a sectional view according to the line IV—IV depicted in the aforementioned FIG. 3, FIG. 6 is a front view of the component depicted in the aforementioned FIG. 5, FIG. 7 is a sectional view according to the line VII—VII depicted in the aforementioned FIG. 6,

DETAILED DESCRIPTION OF THE INVENTION

The invention presented here involves an instrument panel for vehicles, designed in particular for automobiles.

However, although developed most particularly for applications of that sort, it may also be used in numerous other nautical, air and/or terrestrial vehicles. In a general way, moreover, it will be possible to implement it as internal fittings which combine different accessories and/or equipment, in all the areas of economic activity in which one encounters control stations, switchboards, or other stations that may be in fixed or mobile installations.

Figure 1:
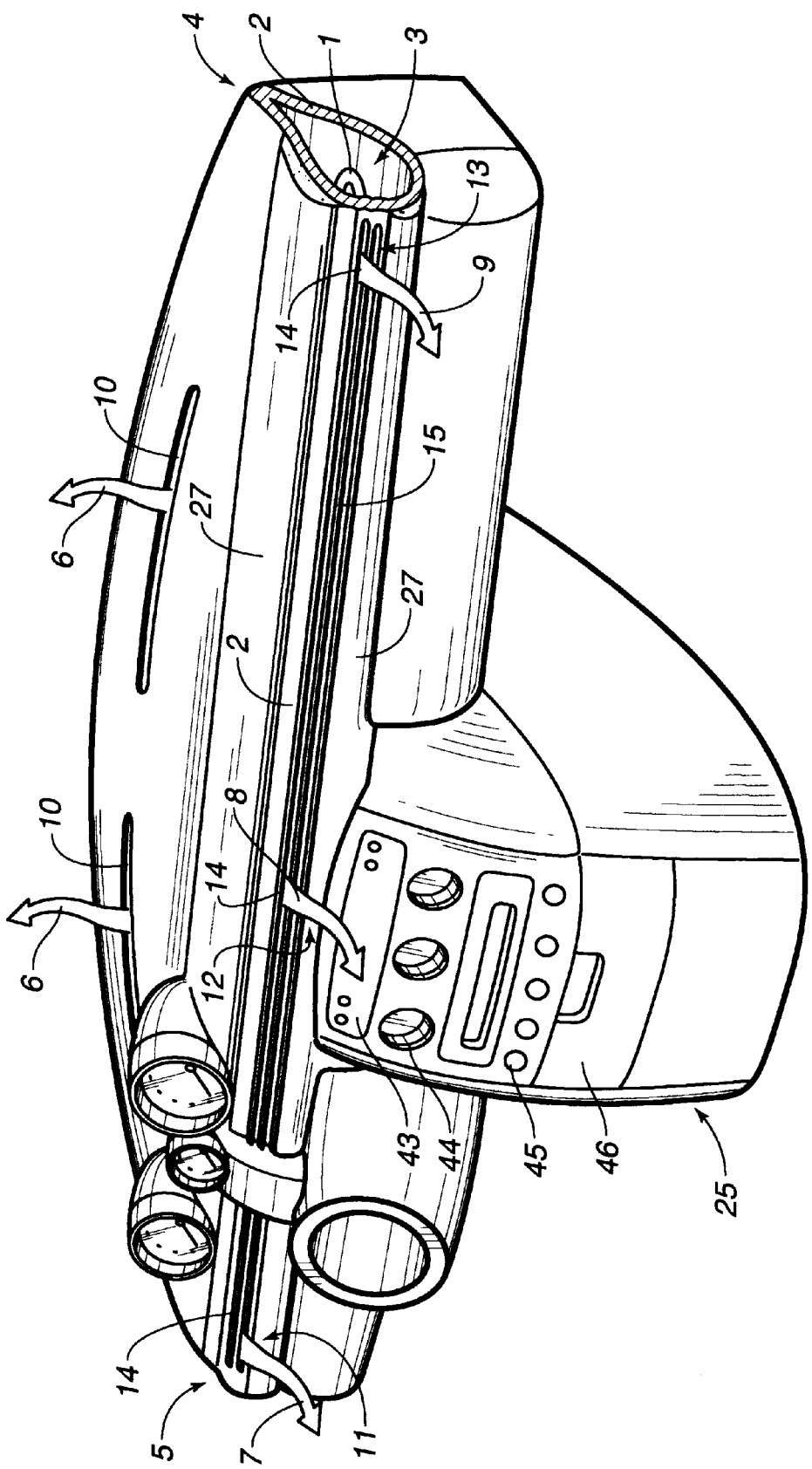
FIG. 1 shows, in perspective, an example of the instrument panel according to the invention.
Figure 2:
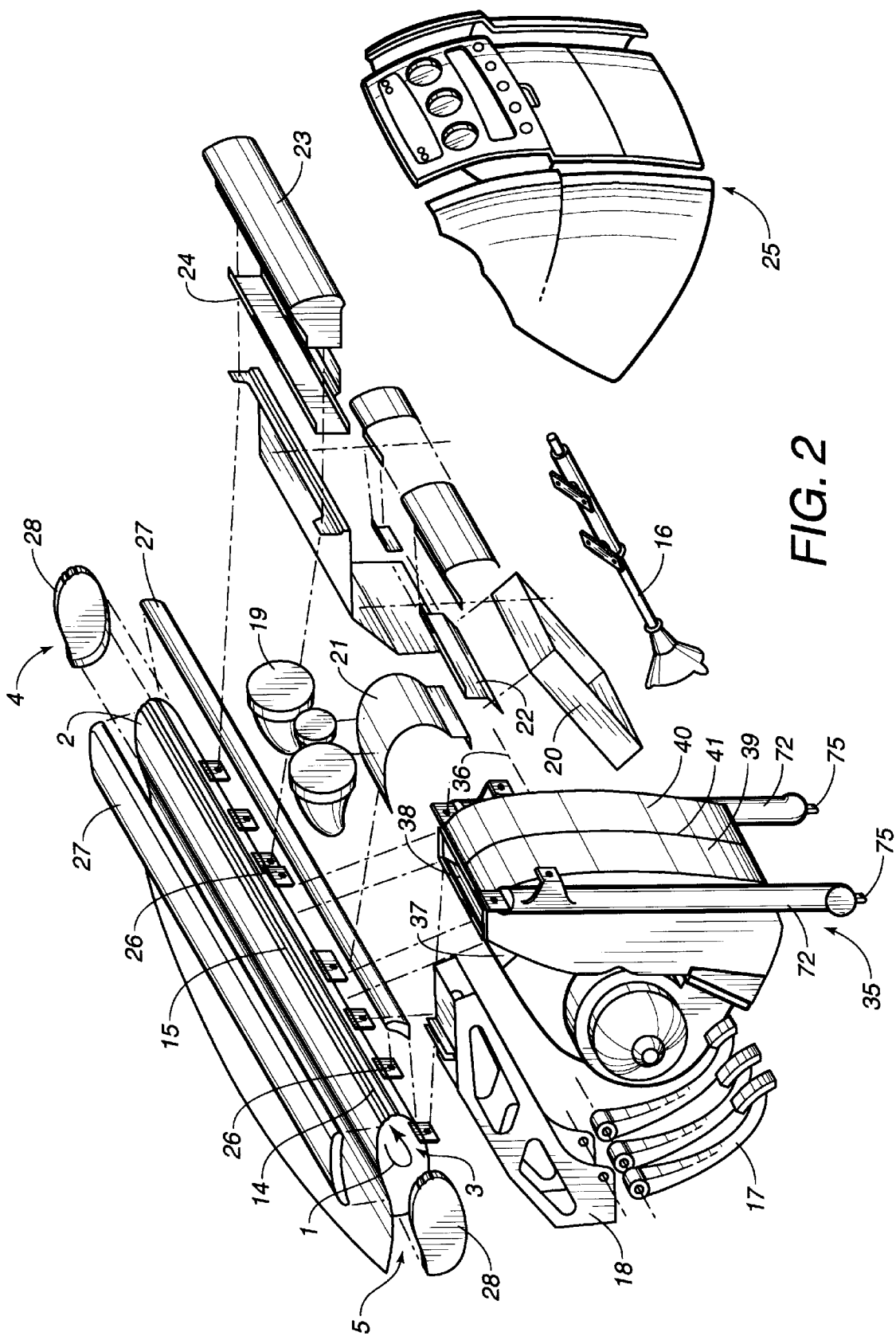
FIG. 2 shows, in an exploded view, the instrument panel depicted in FIG. 1.

As depicted in FIGS. 1 and 2, the instrument panel for vehicles according to the invention allows at least for circulation of the air flow 1 for ventilation, heating and/or air conditioning of the vehicle passenger compartment.

For this, according to the invention, it has at least one cross strut 2 suitable for strengthening the resistance of the vehicle to lateral shocks. The cross strut 2 is tubular so that it is able to form at least one conduit 3 for the air flow 1.

The invention thus allows the lateral distribution of the air flow using only one conduit. In addition, the conduit presents the advantage of not depending on the equipped vehicle class or the position of its steering column because it forms an integral part of the structure of the body of the vehicle.

It is also to be noted that a sole conduit can contribute to reducing the length of travel for the air flow and thus avoid very sizable head losses. In addition, due to the fact that the reinforcement cross strut planned in the passenger compartment also acts as an air conduit according to the invention, it is possible to decrease the number of parts to use.

The longitudinal ends 4, 5 of the cross strut 2 are intended to be directed, for example, towards the lateral sides of the vehicle.

According to the embodiment depicted, the cross strut 2 is visible, at least partially, in the passenger compartment of the vehicle. By this it is intended that its surface appears at least partially in view of the driver and/or the passengers. Moreover, it will be possibly equipped with a surface treatment designed to improve its exterior appearance.

In addition, the cross strut 2 has, in particular, the openings 10–13 fitted to allow the distribution of air toward the glass walls, the driver and/or the passengers of the vehicle, as shown by the arrows indicated by 6–9, respectively, in FIG. 1.

The opening(s) allowing the distribution of air towards the glass walls is/are made, notably, of slots 10 roughly oriented in parallel to the longitudinal axis of the cross strut 2.

As for the openings 11–13 allowing the distribution of air towards the driver and/or the passengers, they are, for example, at one and/or the other end of the cross strut 2 and/or in its middle section. However, as the conduit 3 crosses the vehicle in a continuous manner along its width, they can also be at any other visible point of the cross strut 2, depending on the requirements.

Furthermore, the openings 11–13 allowing the distribution of air towards the driver and/or the passengers are covered, for example, by a screen 14. With the object of simplification, the screens 14 might be fixed if necessary, where the adjustment of the flow is performed as it is developed further upstream.

The openings 10–13 are, for example, in the visible section of the cross strut 2. The cross strut has, moreover, in particular, a decoration 15 allowing the formation of an extension of the screens 14.

With reference to FIGS. 3 and 4, it is observed that the transverse section of the cross strut 2 is defined, for example, according to a lightly bending curve, particularly towards the windshield of the vehicle, in order to facilitate the flow of the part of the air flow 1 intended for the defrost.

This being the case as shown in FIG. 2 according to the embodiment shown, the cross strut is also able to form a support for different equipment and/or accessory components inside the vehicle.

This can involve, for example, a steering column 16 and a pedal assembly 17 secured to the cross strut 2, in particular, by a first support armature 18.

This can also involve, for example, combined instrumentation 19 and/or a fuse box 20 mounted onto the cross strut 2 using second and third support armatures 21, 22, respectively.

This can again involve, particularly a device of inflatable padding 23, mounted onto the cross strut 2, for example, by a fourth support armature 24.

A central console 25 can, in addition, if necessary be fixed, directly or not, to the cross strut 2.

For this, the cross strut is equipped in particular with several mounting tabs 26.

The instrument panel according to the invention comprises, if necessary decorative panels 27 partially covering the cross strut 2. These panels reinforce the aesthetic appearance of the instrument panel and are made up, for example, of a material allowing the absorption of energy so as to strengthen the crash safety for the driver and/or the passenger.

As for the strut 2, it is either of sheet steel or of molded material such as magnesium, aluminum or composite fibers. Moreover, it is equipped at its two longitudinal ends 4, 5 in particular with stoppers 28 fitted to end the conduit 3.

Figure 5:
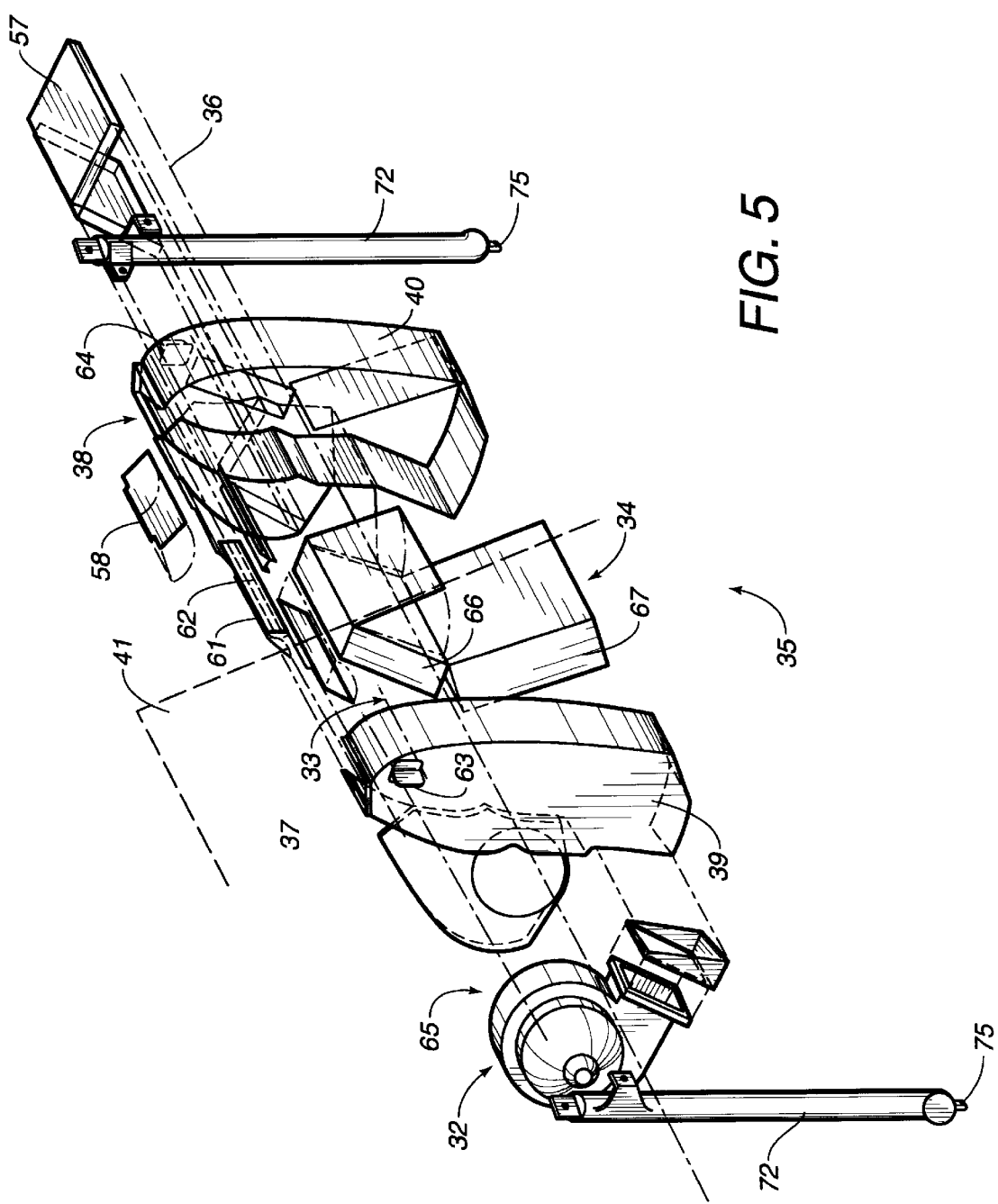
FIG. 5 is an exploded view of an embodiment example of a component of the instrument panel depicted in the aforementioned FIG. 2.

If reference is now made to FIGS. 5 to 7, it is observed that, according to the embodiment shown, the instrument panel according to the invention includes, in addition, and cooperating with the strut 2, a casing 35 of a device for the treatment of air. The casing 35 is suited to allow the passage of the air flow 1 between at least one air intake 37 and one air outlet 38, planned on its surface. The casing 35 includes the mechanisms for ventilation 32, heating 33 and/or air conditioning 34, such that it is possible to air condition the air flow 1.

The casing 35, notably rigid, is equipped, if necessary, with a longitudinal axis 36, where the mechanisms for ventilation 32, heating 33 and/or air conditioning 34 can be roughly distributed radially around the longitudinal axis 36, which is to be roughly horizontal.

In the following, it is assumed that the mechanisms for air conditioning are present. As depicted in FIG. 5, the casing 35 includes two casing sections 39, 40 assembled to each other along a joining plane 41 and including of the supports for the mechanisms for ventilation 32, heating 33 and air conditioning 34. In practice, the mechanisms for ventilation 32 include a centrifugal fan or air blower 65, the heating mechanisms 33 of a radiator 66, and the air conditioning mechanisms 34 of an evaporator 67 connected to the refrigerating circuit of the vehicle (not shown).

The air intake 37 has a control flap 58 which allows, depending on its position, the drawing in of an air flow I by the air blower 65 from outside the vehicle according to the arrow 70, or from the inside of the passenger compartment according to the arrow 71, specifically in order to allow its recirculation. The flap 58 is controlled by the driver from a control panel 44. One or more filters 57 mounted in a chamber 49 upstream from the air blower 65 makes it possible to clear the air flow 1.

With reference to FIG. 7, it is observed that the air flow 1 leaving the air blower 65 passes through the evaporator 67 where it cools down. Then, a part 1A of this air flow 1 escapes out from the radiator 66, while the rest 1B bypasses it as a function of the position of the flaps 68 and 69 so that the mixture of the flows 1A and 1B gets in a chamber 50, and gives an air flow at an average temperature as a function of the position of the flaps 68 and 69. These flaps 68 and 69 are adjusted by the driver by using the control panel 44 and a linkage (not shown).

If one does not wish to air-condition the vehicle, all that has to be done is to remove the evaporator 67 and leave its space free, so that the flow then passes directly from the air blower 65 to the radiator 66 and/or to the air outlets 38.

The casing sections 9, 10 are made for example by molding, especially from plastic material.

This being the case, the casing 35 is secured at the level of the central region of the instrument panel, for example, under the cross strut 2.

In addition, the cross strut 2 is, in particular, separated longitudinally, for example by an internal partition 76, into two conduits 73, 74 and the casing 35 has a single air outlet 38 coming out into the conduits 73, 74. For this, the outlet 38 adjoins, in particular, the two corresponding openings planned opposite on the lower side of the cross strut 2 to either side of the internal partition 76.

Moreover, the instrument panel is equipped at the level of the outlet 38, with mechanisms for selecting the course of the air flow 1 towards each of the conduits 73, 74.

At the level of the outlet 38, the casing 35 thus has, in particular, a flap 61 making it possible to adjust the quantity of air sent through the conduit 73 toward the windshield while a flap 62 makes it possible to adjust the quantity of air sent through the conduit 74 toward the driver and/or the passengers.

If reference is made to FIG. 5 especially, it is observed that the instrument panel possibly additionally has two legs 72 secured to the casing 35 in a way so as to constitute a support piece. For this purpose they have, on their ends for example, flanges 75 attached specifically to the floor board of the vehicle.

Moreover, the openings equipped with flaps 63, 64, planned on each of the casing sections 39, 40, adjoin to the legs 72, planned to be tubular so as to make it possible to regulate, in an adjustable manner, a part of the air flow I towards the vehicle floor board.

As depicted in FIG. 7, the casing 35 is possibly covered by the central console 25. The central console integrates different components of the inside equipment such as, specifically, an indicator 43, the control panel 44, a car radio 45, an ash tray 46 and/or other items.

Of course other items implemented by the invention presented here, understood by the expert, could have been imagined without necessarily going out of the scope of the present invention.

What is claimed is:

1. An apparatus for allowing an air flow circulation for ventilation, heating and air conditioning, the apparatus comprising:

a vehicle having a passenger compartment defined in part by a first interior side wall and said interior side wall;

at least one cross strut having one end abutting said first interior side wall and an opposite end abutting said second interior sidewall, said cross strut positioned so as to extend across said passenger compartment, said cross strut positioned so as to resist a movement of said first interior side wall toward said second interior side wall, said cross strut being tubular and of arcuate shape in a transverse cross-section, said cross strut forming at least one conduit for the air flow circulation, said cross strut having an exterior surface exposed in said passenger compartment, said cross strut having a plurality of mounting brackets affixed to said exterior surface of said cross strut; and a mechanism for ventilators or heating or air conditioning affixed to at least one of said plurality of mounting brackets, said mechanism extending radially outwardly from said exterior surface of said cross strut, said mechanism communicating with said conduit and having a casing formed generally centrally of said cross strut between said cross strut.

2. The apparatus according to claim 1, said cross strut having openings therein, said openings adapted to direct the air flow circulation to desired locations within the vehicle.

3. The instrument panel according to claim 1, said exterior surface comprising a decorative panel partially covering said cross strut.

4. The instrument panel according to claim 1, said casing having at least one air intake and one air outlet on a surface thereof, said cross strut adapted to allow a passage of air flow between said air intake and said air outlet.

5. The apparatus according to claim 4, said casing being mounted under said cross strut.

6. The apparatus according to claim 4, said air intake having a control flap affixed thereto, said control flap adapted to draw in air from exterior of the vehicle or from interior of the passenger compartment.

7. The apparatus according to claim 4, said cross strut being separated longitudinally into two conduits, said casing having a single air outlet communicating with said with said two conduits, said instrument panel further comprising:

means for selecting a course of air flow toward each of said two conduits, said means connected to said cross strut.

8. The apparatus according to claim 4, said casing having two legs secured thereto so as to form a support for said casing.

\* \* \* \* \*